(12) United States Patent
Trebouet et al.

(10) Patent No.: US 10,919,500 B2
(45) Date of Patent: Feb. 16, 2021

(54) DEVICE FOR CLEANING AN OPTICAL SENSOR OF AN OPTICAL DETECTION SYSTEM FOR A MOTOR VEHICLE

(71) Applicant: Valeo Systèmes d'Essuyage, Le Mesnil Saint Denis (FR)

(72) Inventors: Marcel Trebouet, Le Mesnil Saint Denis (FR); Frédéric Giraud, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 74 days.

(21) Appl. No.: 16/336,411

(22) PCT Filed: Aug. 7, 2017

(86) PCT No.: PCT/EP2017/069963
§ 371 (c)(1),
(2) Date: Mar. 25, 2019

(87) PCT Pub. No.: WO2018/059807
PCT Pub. Date: Apr. 5, 2018

(65) Prior Publication Data
US 2019/0232921 A1 Aug. 1, 2019

(30) Foreign Application Priority Data

Sep. 28, 2016 (FR) .................................... 1659177

(51) Int. Cl.
*B60S 1/52* (2006.01)
*B60S 1/56* (2006.01)
*B05B 15/70* (2018.01)

(52) U.S. Cl.
CPC .............. *B60S 1/528* (2013.01); *B05B 15/70* (2018.02); *B60S 1/56* (2013.01)

(58) Field of Classification Search
CPC ............. B60S 1/528; B60S 1/56; B05B 15/70
(Continued)

(56) References Cited

U.S. PATENT DOCUMENTS 9,663,073 B2 *  5/2017  Tanaka ...................... B60R 1/00
9,992,388 B2 *  6/2018  Romack ................ B60S 1/0848
(Continued)

FOREIGN PATENT DOCUMENTS

FR          2675758 A1       10/1992
FR          3021014 A1       11/2015

OTHER PUBLICATIONS

International Search Report and Written Opinion issued in corresponding International Patent Application No. PCT/EP2017/069963, dated Oct. 18, 2017 (10 pages).

*Primary Examiner* — Steven J Ganey
(74) *Attorney, Agent, or Firm* — Osha Bergman Watanabe & Burton LLP (57) ABSTRACT

The invention relates to a cleaning device (100) intended for spraying at least one fluid onto a surface to be cleaned of a motor vehicle, such as an optical sensor of an optical detection system, in which a movable piston (3), sliding inside a hollow body (1) about a stationary rod extending along a longitudinal axis (X) and carrying a cleaning fluid distribution element (8, 9) at one end, allows a fluid to be conveyed towards the distribution element (8, 9) via passage channels (12) arranged between the piston and the rod and having different axial dimensions.

12 Claims, 4 Drawing Sheets

(58) Field of Classification Search
USPC ....... 239/284.1, 284.2; 15/250.001, 250.002, 15/250.003, 250.01; 348/148; 359/509; 134/198
See application file for complete search history.

(56) References Cited

U.S. PATENT DOCUMENTS

| | | | |
|---|---|---|---|
| 10,328,906 B2* | 6/2019 | Hester | B60S 1/483 |
| 2011/0073142 A1* | 3/2011 | Hattori | B60S 1/56 |
| | | | 134/198 |
| 2011/0292212 A1* | 12/2011 | Tanabe | B60S 1/56 |
| | | | 348/148 |
| 2015/0138357 A1 | 5/2015 | Romack et al. | |

* cited by examiner

DEVICE FOR CLEANING AN OPTICAL SENSOR OF AN OPTICAL DETECTION SYSTEM FOR A MOTOR VEHICLE

The present invention relates to the field of driver aid devices and optical detection systems used for that purpose, and relates more particularly to the cleaning devices which are intended to spray at least one fluid toward a surface that is to be cleaned belonging to a motor vehicle, such as an optical sensor of an optical detection system for a vehicle.

Any system comprising optical sensors, such as cameras, laser sensors or other sensors based on the emission and/or detection of light in the spectrum visible or invisible to man, particularly in the infrared, is referred to as an optical detection system.

Such optical detection systems are being fitted to an increasing number of motor vehicles in order to aid the driver of the vehicle in certain driving situations, a well-known example of which is to assist with parking. In order for this assistance to be as effective as possible, the data supplied by the optical detection system needs to be of the highest possible quality, and it is therefore indispensable to have use of sensors capable of performing these data acquisitions. In order to achieve this, a cleaning device may be instructed to inject a cleaning fluid onto a sensor of the optical detection system (for example the lens of an imaging camera) just before the detection is performed (for example the image is taken).

These cleaning devices must not impair the operation of the optical sensor, which means to say that they must notably not lie in the field of view of the sensor, and they must also be as compact as possible in order to meet vehicle space constraints. For that purpose, the cleaning devices usually comprise a part capable of moving between a deployed cleaning position, in which the distribution orifices that the mobile part comprises lie in the vicinity of the surface of the sensor that is to be cleaned, and a rest position in which this mobile part is retracted so that it does not impair the optical detection using the sensor concerned.

The mobile part forms a piston housed in an actuator cylinder. It is known practice to use the pressure of the cleaning fluid admitted to the cylinder to drive the movement of the piston toward its cleaning position, the cleaning fluid also being intended to enter an internal duct of the mobile part, at least when this part is in the cleaning position, so that it can be subsequently injected via the distribution orifices.

The cleaning fluid enters an intake chamber formed in the body via an intake orifice made in an end-piece that closes the cylinder and the fluid present in the chamber pushes against one end of the mobile piston able to move in the body. The piston therefore slides along a rod secured to tongue.

It is known practice to form, at the free end of the fixed rod, secured to the end-piece that closes the cylinder and along which the piston slides, slots that allow the cleaning fluid to pass when the mobile piston is in such a position with respect to the rod that one end of these slots is no longer covered by the mobile piston. In such a position, an upstream first end of the slot is in fluidic communication with the intake chamber.

It will be appreciated that, until a determined relative position of the piston with respect to the rod is reached, sliding takes place sealingly, which means to say that the position of the piston completely covers the slots formed in the thickness of the rod. The fluid present in the chamber is unable to enter the slots because of the position of the mobile piston, and of an associated sealing element, and the fluid is thus prevented from being conveyed toward the distribution orifices.

Beyond a defined position, the slots are no longer covered by the piston at their upstream first end, and that allows fluid to pass into the slots, between the rod and the piston, and therefore allows fluid to pass from the intake chamber toward the inside of the mobile part, and as far as the distribution orifices, via the slots.

By way of example, documents FR2675758 and FR3021014 disclose such cleaning devices in which the fixed rod secured to an end-piece fixed to the cylinder, peripherally comprises a plurality of slots each forming a passage for the cleaning liquid. As explained hereinabove, fluid can be ejected only when the mobile part reaches a determined position with respect to the rod and therefore when the distribution orifices arranged at the end of this mobile part reaches a determined position facing the optical sensor. At this stage, the cleaning fluid arrives en masse in the internal duct, as the ends of the slots are simultaneously uncovered.

Creating these passages in the form of slots made in the thickness of the rod secured to the end-piece that closes the hollow body is rendered difficult because of the small size of the components that are to be produced in order to obtain a cleaning device that can be applied to a motor vehicle for cleaning optical sensors of optical detection systems. It results in manufacturing operations that are difficult to carry out in such a way as to ensure the correct sizing of the slots. Now, the precision with which the radial dimension, which is to say the depth, of the grooves is manufactured is the determining factor in quantifying the amount of liquid that passes from the intake chamber into the piston, and the precision with which the axial dimension, which is to say the length, of the grooves in the direction of sliding of the mobile piston is manufactured is the determining factor in controlling the moment at which the liquid is sprayed onto the optical sensor according to the deployment of the spray nozzles.

Furthermore, it should be noted that the dimensions and/or arrangements of the slots formed in the rod may vary from one device to another, in order to adapt it to suit the dimensions of the optical system that is to be cleaned in particular. The travel of the mobile piston may vary as may the moment at which the spraying of the cleaning fluid is triggered. It will be appreciated that that entails, for each distinct device manufactured according to the teaching of documents FR2675758 and FR3021014, developing and manufacturing a specific rod and end-piece, under the specific manufacturing conditions mentioned hereinabove, namely the small sizes of these components.

It should be noted that, in the embodiment disclosed by document FR3021014, the sealing element that temporarily holds the cleaning fluid back in the intake chamber consists of the lips of a seal also allowing the mobile piston to slide sealingly in the hollow body of the device, ensuring the sealing of the intake chamber. One disadvantage of this embodiment is that the one same sealing element associated with the mobile piston has two operational sealing zones to simultaneously contribute to two sealing actions, namely a first for the sealed sliding of the piston in the hollow body and a second for the sealed sliding of the piston around the rod. Any possible degradation of the sealing element in one of its operational sealing zones entails changing the entire seal.

It is an object of the present invention to propose a cleaning device, intended to spray at least one fluid toward a surface that is to be cleaned belonging to a motor vehicle, such as an optical sensor of an optical detection system, which addresses the above-mentioned disadvantages and allows effective distribution of the cleaning liquid.

One subject of the invention is a cleaning device, intended to spray at least one fluid toward a surface that is to be cleaned belonging to a motor vehicle, such as an optical sensor of an optical detection system for a vehicle, comprising:

a hollow body closed at one end by an inlet flange,
a mobile piston able to slide along a longitudinal axis in the hollow body and which at a first end bears a cleaning fluid distribution element, the piston being able to move between a retracted extreme position and a deployed extreme position,
a rod secured to the inlet flange which runs parallel to the longitudinal axis and along which the mobile piston slides,
means for conveying cleaning fluid through the hollow body, from a fluid intake end-piece as far as the distribution element, comprising at least one intake chamber, the volume of which varies according to the movement of the mobile piston and a distribution duct formed in the mobile piston,
the piston and the rod are configured to provide between them at least one passageway for cleaning fluid.

The cleaning device according to the invention is characterized in that the at least one passageway is formed by a slot formed on the mobile piston. This means that the slot is covered by the rod, completely or partially, according to the relative position of the piston with respect to the rod.

According to the invention, the "means for conveying" the cleaning fluid combine all of the ducts, intake chambers and/or passageways that allow the cleaning fluid to be conveyed from the inlet or intake zone as far as the distribution element. These conveying means contain at least one distribution duct formed in the mobile piston, which for preference is made up of two portions of different diameters. The enlarged upper part of the distribution duct is defined in such a way as to allow the rod to slide in the mobile piston whereas the lower part of said duct, because of its smaller diameter, allows the fluid to be pressurized so that this fluid can be ejected onto the optical sensor with a view to cleaning same.

According to the invention, the "means for moving" the piston are formed at least in part by the fluid conveying means, particularly by the pressure that said cleaning fluid exerts on said piston.

According to various features of the invention, considered alone or in combination, provision may be made that:

the slot of the at least one passageway is arranged parallel to the longitudinal axis;
the mobile piston and the rod are configured in such a way that each passageway formed in the mobile piston is covered, completely in the retracted extreme position, and partially in the other relative positions of the piston and of the rod, by the rod;
the slot of the at least one passageway is formed on the internal wall of the piston delimiting the distribution duct;
the slot of the at least one passageway is formed in the piston so as to open onto the intake chamber.

In one preferred embodiment of the cleaning device, the latter comprises a fluid intake end-piece formed as a projection from the inlet flange and offcentered with respect to the longitudinal axis on which the hollow body is centered. The fluid intake end-piece opens into the hollow body in an intake chamber delimited at least in part by the inlet flange, a peripheral wall of the hollow body, and by the mobile piston.

Advantageously, the means for moving the piston comprise, in addition to the fluid conveying means, which are able to pressurize said cleaning fluid, elastic position-return means housed in the hollow body to tend to return said mobile piston to the extreme rest position. For preference, the elastic position-return means are housed in the hollow body to bear against the hollow piston, on the opposite side to the intake chamber. In one embodiment, the elastic position-return means consist of at least one compression spring able to deform under the effect of the pressure of the cleaning fluid so as to encourage the longitudinal movement of the hollow piston. It will thus be appreciated that, in the phase during which fluid is being filled into the device, the hollow piston moves away from the intake chamber and then effects the reverse return journey at the end of the phase of cleaning by ejection of the fluid.

According to one series of features, provision may be made that:

the hollow piston comprises a substantially cylindrical central part, able to slide inside a hollow guide sleeve formed at the opposite end of the hollow body to the inlet flange, a terminal distribution part extending the central part and to the free end of which the distribution element is able to be fixed, and an intake part extending the central part in the opposite direction to the terminal distribution part and configured to slide inside said hollow body;
the slot of the at least one passageway is formed in the piston and along the intake part;
the terminal distribution part of the piston is designed so that the distribution duct formed in the piston can communicate with a distribution passageway of the distribution element;
the piston comprises, near its upstream end, a ring, against one face of which the elastic return means can bear; for preference, said ring comprises a peripheral groove arranged in its exterior wall and able to accommodate a sealing element, so that the piston fitted with said element can slide sealingly within the hollow body;
a peripheral groove may be arranged at a free end of the rod, to accept a seal, so that the rod, fitted with said seal, can slide sealingly in the central part of the piston.

The cleaning device according to the invention may comprise a plurality of passageways situated between the rod and the mobile piston, with at least one of the slots formed in the mobile piston having an axial dimension that is distinct from that of the adjacent slots; alternatively or at the same time, at least two slots formed in the mobile piston may have variable radial dimensions.

What is meant by "axial dimension" is the height of a passageway in the direction of the longitudinal axis (X) of elongation of the mobile piston, whereas what is meant by "radial dimension" is the depth of said passageway, in the thickness of the part of the mobile piston and/or of the rod in which the passageways may be formed.

The particular arrangements and sizings of the slots that form the passageways make it possible to vary the fluid flow rate by offering larger or smaller flow sections. In particular, altering the radial dimension of a passageway may influence the quantity of cleaning fluid passing from the intake chamber to the distribution element, and offering an axial dimension that differs from one passageway to another makes it possible to control the fluid passage flow rate, and therefore the fluid sprayed onto the glazed element that is to be cleaned, as the mobile piston gradually deploys, which deployment influences the position of the spray nozzles with respect to this glazed element. Whatever the radial dimensions and geometries of the passageways, it is necessary to maintain enough land between two consecutive passageways that the piston can be optimally guided around the rod.

According to another feature of the invention and with a view to falling within an overall hydraulic scheme, the device for cleaning a sensor may comprise, in addition to the intake end-piece, the hollow body, the rod and the mobile piston that bears the passageways, a cleaning fluid storage reservoir and elements for controlling the circulation of cleaning fluid between the reservoir and the intake end-piece. Said control elements may consist of a pump and optionally of a solenoid valve and are configured to prevent cleaning fluid from being admitted to the intake end-piece in a rest position, to supply the intake end-piece with cleaning fluid in order to move the distribution element into a cleaning position on the one hand and spray the cleaning fluid on the other hand, and to prevent the cleaning fluid from being admitted to the intake chamber and the distribution passageway and keep the distribution element in the cleaning position.

When incorporated into the hydraulic system, the solenoid valve is an electrically operated 3-way valve able to allow or prevent the passage of a pressurized fluid according to three different positions so as to allow circulation from the pump as far as the actuator, or prevent any circulation or else allow liquid to return from the actuator to the reservoir.

A second subject of the invention is a motor vehicle equipped with an optical detection assembly, characterized in that it comprises at least one cleaning device as described hereinabove, intended to spray at least one fluid toward a surface of the optical optical sensor that is to be cleaned.

Further features, details and advantages of the invention and of the operation thereof will become more clearly apparent from reading the description given hereinafter by way of indication, in association with the attached figures, in which.

It should first of all be noted that while the figures explain the invention in detail for the implementation thereof, they may of course also serve the better to define the invention as appropriate. It will also be appreciated that the embodiment of the invention illustrated by the figures is given by way of nonlimiting example. Therefore, other configurations of the device according to the invention may be produced, notably by varying the arrangement, distribution and the axial and/or radial sizing of the passageways, which will necessarily have an impact on the cleaning fluid flow rates and associated pressures.

It is also recalled that, in the description which follows, the terms "upstream" and "downstream" refer to the direction in which the cleaning fluid flows in the cleaning device according to the invention. Thus, the term "upstream" refers to that side of the device according to the invention via which this cleaning fluid is admitted into said device, and the term "downstream" refers to that side of the device according to the invention via which the cleaning fluid is distributed to the outside of this device, toward a surface of an optical sensor of an optical detection assembly of a motor vehicle.

Figure 1:
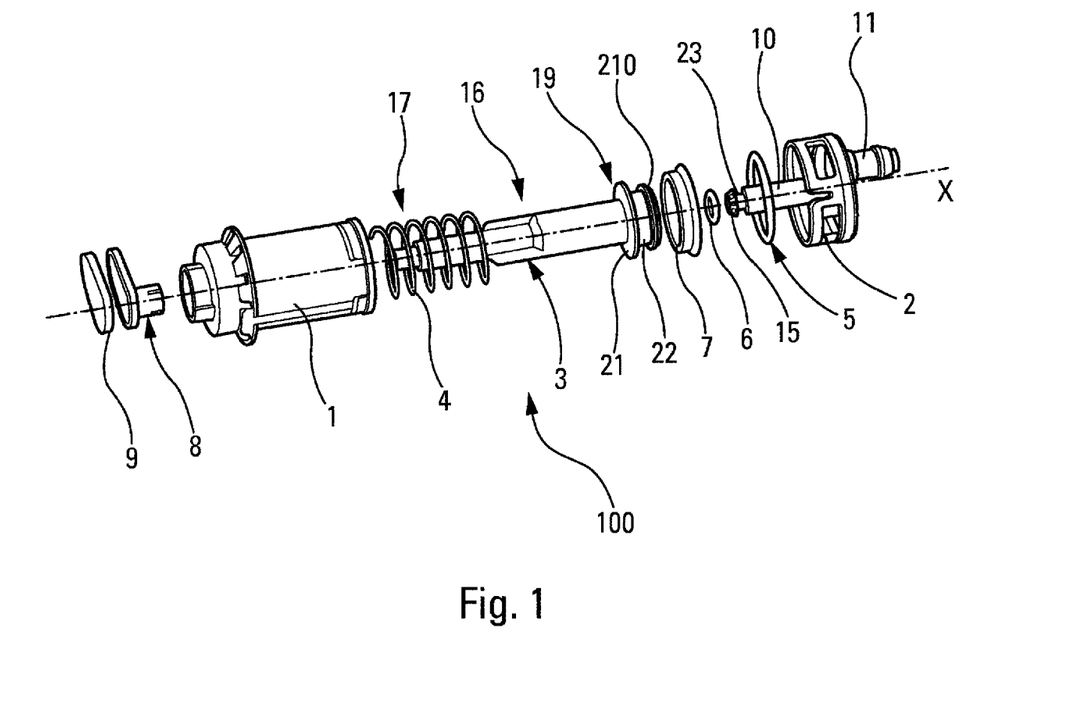
FIG. 1 is an exploded perspective view of a cleaning device according to the invention, intended to spray at least one fluid toward a surface that is to be cleaned belonging to a motor vehicle, such as an optical sensor of an optical detection system, the cleaning device comprising at least one mobile piston able to slide in a hollow body along a fixed rod and bearing a fluid distribution element at one end.

FIG. 1 illustrates a cleaning device 100 intended according to the invention to spray at least one fluid toward a surface that is to be cleaned belonging to a motor vehicle, such as an optical sensor 30, the cleaning device being essentially made up, from upstream to downstream along a longitudinal axis (X) of elongation of the cleaning device, of a fluid intake end-piece 11, of an inlet flange 2, of a rod 10 secured to the inlet flange 2, of a piston 3, of an elastic position-return means 4 and of a distribution element 8, 9. Each of these components is housed inside, or fixed to one end of, a hollow body 1 of revolution about a longitudinal axis (X).

The fluid intake end-piece 11 is formed as a projection from the inlet flange 2 and extends in the opposite direction to the hollow body 1, being in this instance offcentered with respect to the longitudinal axis (X) of the hollow body 1. The intake end-piece 11 has a longitudinal through-bore opening inside the hollow body 1 into an intake chamber 14 (visible notably in FIGS. 4 and 5) delimited at least in part by the inlet flange 2, a peripheral wall of the hollow body 1 and by the mobile piston 3.

The inlet flange 2 is configured to close the upstream end of the hollow body 1. A sealing member 5 may be provided at this closure. The inlet flange is configured to support the rod 10 on its internal face, facing toward the inside of the hollow body.

The rod 10 extends as a projection from the inlet flange 2, inside the hollow body 1. The rod has a cylindrical shape of circular cross section, the exterior peripheral face being smooth. The free end 15 of the rod 10, which extends in the opposite direction to the inlet flange 2, comprises a peripheral groove 23 able to accept an O-ring seal 6 so as to allow the rod 10 to slide sealingly in the piston 3. As will be described hereinafter, the O-ring seal 6 is configured to bear against an internal face of the piston such that the fluid is held back upstream of the O-ring seal between the rod and the piston, as long as the slots formed in the piston do not allow the fluid to escape toward the distribution element.

The piston 3, at a first end, or downstream end, bears a cleaning fluid distribution element 8, 9 made up, in the example illustrated, of two complementary parts in the shape of an L.

The piston 3 comprises, near its upstream end, namely the end facing toward the inlet flange 2, a ring 21 on the exterior wall of which is arranged a peripheral groove 22 able to accommodate a sealing element 7 so as to allow the piston 3 to slide sealingly in the hollow body 1. The sealing element 7 is preferably a lip seal able to limit friction between the piston 3 and the hollow body 1.

It may be noted that the seal 6 that contributes to sealing the sliding between the piston 3 and the rod 10 is distinct from the sealing element 7 that contributes to sealing the sliding between the piston 3 and the hollow body 1. Any potential wearing of one of them entails replacing it alone, without the need to replace the other.

The piston is cut from one end to the other by an internal cleaning fluid circulation duct 13. A more detailed description will be given hereinafter of the internal shape of the piston which, in this instance, is specific notably in that it has a plurality of slots 120 configured to form passageways 12 for the cleaning fluid.

Figure 5:
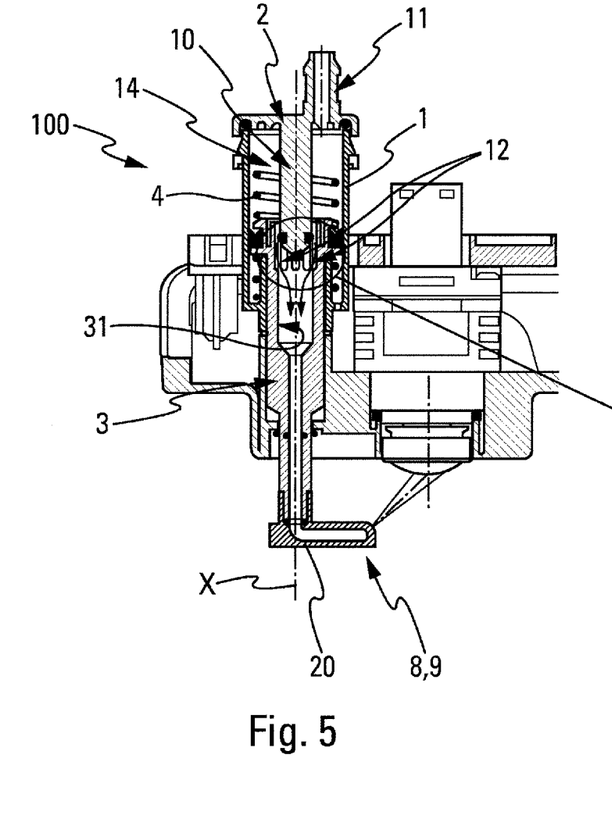
FIG. 5 is a view in cross section, in the same plane of section as that of FIG. 3, of the cleaning device of FIG. 1, when the mobile piston is in the deployed extreme position.
Figure 5A:
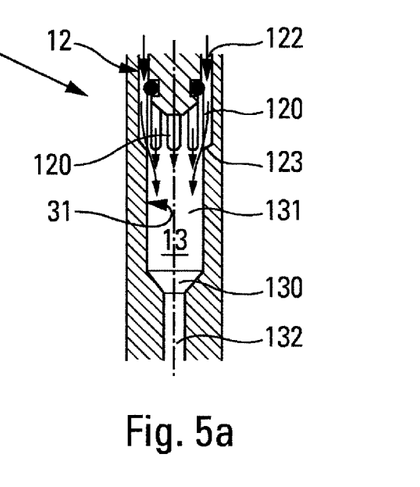
FIG. 5a is a detailed view of the free end of the rod around which the piston slides in this deployed extreme position.

The mobile piston 3 slides in the hollow body 1 between a retracted extreme position, or rest position (visible in FIG. 3), and a deployed extreme position, or cleaning position (visible in FIG. 5).

The cleaning fluid is injected into the hollow body via the intake end-piece so that it can subsequently be ejected via the distribution orifices. Means for conveying the cleaning fluid through the hollow body 1, from the fluid intake end-piece 11 as far as the distribution element 8, 9, comprise at least the intake chamber 14 and a distribution duct 13 (visible in FIGS. 3 to 6) formed in the mobile piston 3.

The elastic return means 4, preferably a coil spring, is arranged in the hollow body between the peripheral wall and the piston, so as to bear at one end against the end wall of the body and at the opposite end on a face of the ring 21.

The piston is mounted in the hollow body around the rod which extends substantially coaxial to the mobile piston 3 so that at least the free end 15 of the rod 10 extends inside the internal distribution duct 13 of the mobile piston 3. The hollow piston 3 comprises substantially cylindrical portions that can be defined, from upstream to downstream, as being an intake part 19 bearing the ring 21, a central part 16 able to slide within a hollow guide sleeve 18 formed at the downstream end of the hollow body 1, and a terminal distribution part 17, of smaller diameter, to the free end of which the distribution element 8, 9 is able to be fixed. The distribution duct 13 formed in the mobile piston is made up of at least two portions of different diameters, of these one being a proximal first part 131 extending from an upstream end of the duct, namely an end opening onto the intake chamber 14, and another being a distal second part 132 extending from the downstream end of the duct. As illustrated in FIGS. 3 to 6, a narrowed zone 130 is arranged between the proximal and distal parts of different diameters.

The enlarged proximal first part 131 of the distribution duct 13 is defined in such a way as to allow relative sliding of the rod 10 with respect to the mobile piston 3, whereas the lower second part of said duct 13, because of its smaller diameter and the resulting region of narrowing, allows the fluid to be pressurized so that it can be ejected onto the optical sensor 30 with a view to cleaning same. The distribution terminal part 17 of the piston 3 is designed to collaborate with the upstream portion 8 of the distribution element so that the lower second part of the distribution duct 13 can communicate with a distribution passageway 20 formed in the distribution element 8, 9.

The piston 3 and the rod 10 are configured to provide between them passageways 12 which allow the cleaning fluid to flow from the intake chamber 14 (visible notably in FIG. 4), the variable volume of which is defined according to the position of the piston 3 relative to the inlet flange 2. The passageways 12 are obtained by slots 120 formed in the interior wall 31 of the piston 3, these slots being covered by the smooth exterior peripheral face of the rod 10, completely or partially according to the relative position of the rod with respect to the piston. In the embodiment illustrated in FIG. 1, the slots 120 are formed in the interior wall 31 of the piston 3 delimiting the internal distribution duct 13 along the intake part 19, and have similar axial and radial dimensions to one another, but it will be appreciated that other arrangements may be anticipated without departing from the scope of the invention, when the slots are formed in the piston 3, on the interior wall 31, the advantages of such an arrangement on the piston being detailed hereinafter.

The intake part 19 thus comprises slots 120 whereas the central part 16 of the piston is smooth. The relative sliding of the piston with respect to the rod is thus a sealed sliding, preventing the passage of fluid, when the O-ring seal 6 formed in part by the free end 15 of the rod 10 lies in the central part 16 of the piston and therefore bears continuously against the interior wall 31 of the piston 3, whereas it consists in a permeable sliding, allowing the passage of fluid, when the O-ring seal 6 lies in the intake part 19, as the fluid can escape via the slots the ends of which are uncovered.

Figure 2:
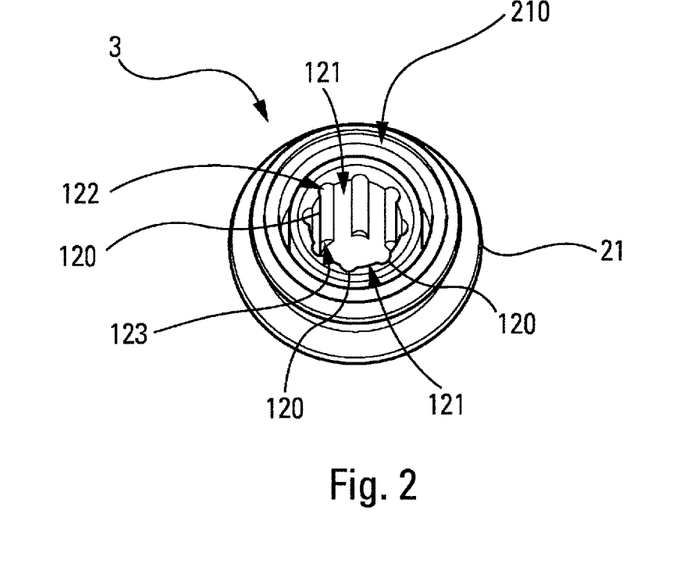
FIG. 2 is a view in cross section of the piston of the device of the invention, in a plane perpendicular to the longitudinal axis (X) of FIG. 1, at an end part at the opposite end from the end bearing the fluid distribution element, showing the slots formed circumferentially on an interior wall of the mobile piston for the passage of cleaning fluid.

FIG. 2 illustrates one embodiment of the invention and shows one nonlimiting example of an arrangement of the slots 120 that form the passageways 12 formed on the interior wall of the piston 3. Enough land 121 is left between two consecutive slots. What is meant by enough land is that regardless of the size and number of the slots, the rod and the piston have enough area of contact with respect to the gaps left by the slots that the piston can be guided stably around the rod. In this example, eight passageways are formed by the combination of one of the eight slots formed in the interior wall of the piston 3 and of the rod 10 bearing against this interior wall.

These slots 120 extend axially, between a proximal end 122 that opens onto an end face 210 of the ring 21 that contributes to delimiting the intake chamber 14, and a distal end 123, in the thickness of the mobile piston 3 and extending to a determined axial dimension of this proximal end face 210 of the ring 21.

These slots 120 which contribute to forming the passageways may have variable axial or radial dimensions or even variable depths.

One example of the deployment of the distribution element in the cleaning device according to the invention will now be described in greater detail with reference notably to FIGS. 3 to 5 which illustrate successive steps in the deployment.

Figure 3:
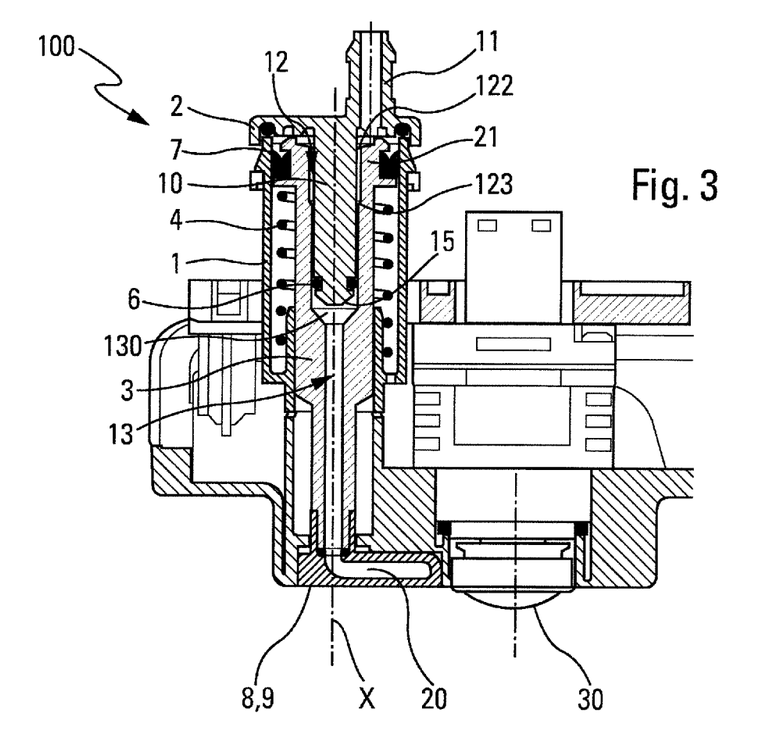
FIG. 3 is a view in cross section, in a plane of section containing the longitudinal axis (X), of the cleaning device of FIG. 1 when the mobile piston is in the retracted extreme position, or rest position.

FIG. 3 illustrates the cleaning device of the invention in a first, rest, position, in which the distribution element 8, 9 is in the retracted position and housed in the lower part of the body of the cleaning device 100. The piston is therefore arranged in such a way that the intake part 19 is pressed firmly against the inlet flange, the intake chamber 14 then being reduced to a minimum volume. In this rest position, the elastic return means is in the uncompressed state, defining the free length of the spring 4.

It is of note that, in this rest position, the free end of the rod 10 extends deeply into the internal distribution duct 13 formed in the mobile piston so that this free end 15 of the rod lies substantially in the vicinity of the narrowed region 130. In this rest position, the slots 120 arranged in the piston 3 are completely covered by the rod 10 so that, at the distal end 123 of each of these slots, the passageways are closed. The presence of the O-ring seal 6 arranged in the peripheral groove 23 of the rod and dimensioned to rub against the internal wall 31 of the piston 3, ensures sealing and prevents fluid from passing toward the distribution element.

In this rest position, fluid is injected into the cleaning device when an action to clean an optical sensor is instructed. The fluid spreads between the inlet flange and the mobile piston, into the intake chamber 14, and also infiltrates the passageways, each slot 120 forming a passageway having a free proximal end 122 which opens onto the end face 210 of the ring 21 and which is therefore accessible from the intake chamber. As has just been described, the slots formed in the piston are completely covered by the rod in this rest position and any fluid infiltrating the passageways remains trapped therein.

Figure 4:
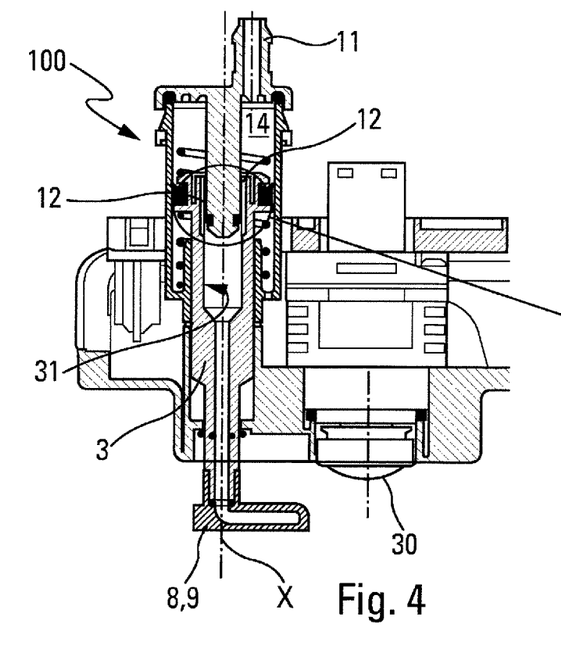
FIG. 4 is a view in cross section, in the same plane of section as that of FIG. 3, of the cleaning device of FIG. 1, in an intermediate position in which the cleaning fluid is allowed to pass into the mobile piston via passageways.
Figure 4A:
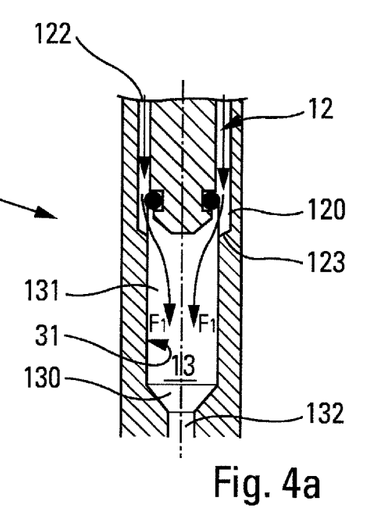
FIG. 4a is a detailed view of the free end of the rod around which the piston slides in this first intermediate position.

FIG. 4 illustrates the cleaning device according to the invention in an intermediate position between the rest position and the deployed extreme position. This intermediate position is obtained following the sliding of the piston along the rod, under the effect of the pressure of the cleaning fluid, notably against the ring of the piston 3, cleaning fluid continuing to be injected by the intake end-piece. In this first intermediate position, the piston has slid along the rod so that the free end 15 of the rod 10 is distant from the narrowed region 130; the seal 6 is no longer situated in the central part 16 of the piston but is situated near the intake part 19 of the piston in which the slots 120 extend. The rod and the O-ring seal 6 no longer cover the distal end 123 of the slots 120, as the O-ring seal lies between this uncovered distal end and the end face 210 of the ring 21. The cleaning fluid present in each of the slots can therefore infiltrate into the distribution duct 13, as illustrated by the arrow F1 visible in FIG. 4*a*, and fluid can circulate from the intake chamber 14 toward the distribution element 8, 9 via the passageways.

FIG. 5 illustrates the deployed extreme position, namely the position of maximum deployment of the cleaning device. The opposing pressure exerted by the spring 4 and/or by the ring 21 of the piston coming into abutment against the hollow guide sleeve 18 makes it possible to limit the movement of the rod with respect to the piston and prevent the rod from escaping from the distribution duct 13 formed in the piston 3. In this position of abutment, the distal end of each of the slots is uncovered and the seal 6 has the only effect of preventing fluid from passing between the two internal and external walls of the piston and of the rod, without impeding passage along the slots. The distribution element 8, 9 is therefore fully deployed out of the cleaning device so as to adopt an optimum position for cleaning the optical sensor 30, and the flow rate at which the fluid is ejected is at a maximum.

At the end of this phase of cleaning by ejecting the entirety of the fluid, the piston, having moved in the opposite direction to the intake chamber, performs a reverse return journey under the combined effect of the return of the spring and of the cutting-off of the supply of fluid via the intake end-piece, the spring then pushing the piston back to its original position, driving any remaining fluid back out of the intake chamber and out of the hollow body.

Figure 6:
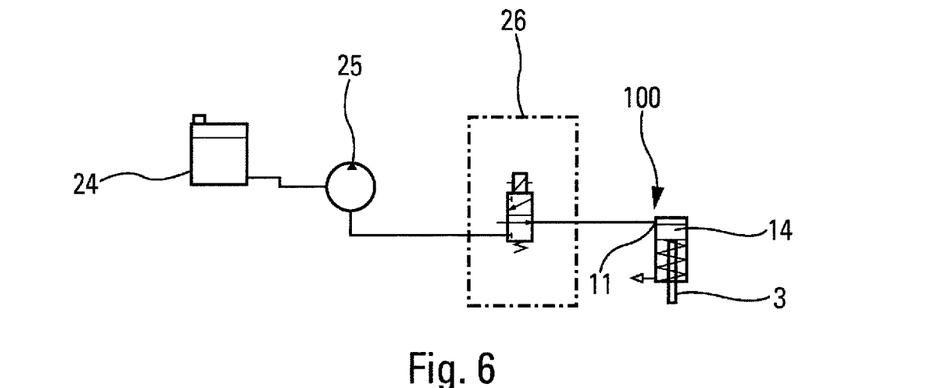
FIG. 6 is a schematic indication of the hydraulic architecture associated with the cleaning device according to the invention.

FIG. 6 schematically illustrates the overall hydraulic architecture associated with the cleaning device 100 and which may comprise, aside from the intake end-piece 11, the hollow body 1, the rod 10 and the mobile piston 3 that bears the passageways with different axial dimensions, a reservoir 24 for storing the cleaning fluid and elements for controlling the circulation of cleaning fluid between the reservoir 24 and the intake end-piece 11 of said cleaning device 100 which, in this instance, is schematically indicated as an actuator. Said control elements may be made up of a pump 25 and optionally of a solenoid valve 26.

It will be appreciated that, at the end of the phase of cleaning by ejection of all of the fluid, the fluid, under the effect of the return of the piston driven by the spring into the rest position, passes through the intake end-piece then returns to the pump and to the storage reservoir.

The foregoing description clearly explains how the invention makes it possible to achieve the objectives it set itself and notably how the invention offers a device for cleaning an optical sensor of a motor vehicle which, through a special layout of the slots that form the passageways for the cleaning fluid, namely a layout of these slots in the mobile piston rather than on the fixed rod, makes it possible to simplify the manufacture of the components that make up the cleaning device intended to spray at least one fluid toward a surface that is to be cleaned belonging to a motor vehicle, thereby facilitating the production of the components that need to be reworked when the device needs to have a special sizing as compared with the standard sizing originally designed, and makes it possible to limit the after-sales operations to be performed in the event of the wearing of a sealing element.

Advantageously according to the invention, the slots 120, which contribute to forming the passageways for the cleaning fluid between the piston and the rod, are formed in the interior wall 31 of the mobile piston 3 rather than on the exterior face of the rod 10. Thus, for a defined number of slots, creating these on the mobile piston, which has dimensions, in this instance diameter, which are greater than those of the rod, allows larger land to be left between two slots and facilitates the relative sliding of the rod with respect to the piston. In the context of a miniature device, which needs to be positioned in the immediate vicinity of an optical detection system of the reversing camera type housed in the bumper of a motor vehicle, which may entail an order of magnitude of 4 to 7 mm for the diameters of the rod and mobile piston, manufacture is simplified when the slots have to be made on the element that has the larger diameter.

Another advantage in creating the slots on the mobile piston is that the slots open into the intake chamber formed in the inlet flange and the ring arranged at the end of the piston housed in the hollow body. As soon as fluid arrives in the intake chamber, the fluid begins to spread out into the passageways. As a result, when the relative position of the piston with respect to the rod allows fluid to pass into the internal distribution duct via the passageways, these passageways are already full. There is therefore little or no surge in the distribution of fluid. Because the passage of the fluid from the intake chamber to the passageways occurs with a significant reduction in cross-sectional area, it will be appreciated that it is advantageous according to the invention for the time spent for the fluid to fill these passageways to run in parallel with the time taken for the mobile piston to deploy toward the position relative to the rod in which the fluid can access the internal distribution duct.

Moreover, having the slots on the mobile piston makes it possible to limit the number of components that need to be modified with respect to the standard version of the device when a device having different functional characteristics (for example, sprayed-fluid flow rate, travel of the device before spraying, etc. . . . ) is to be developed, something which entails a different sizing and/or arrangement of the slots. The rod can remain in a standard format, and there is then no need to modify the inlet flange, as a projection from which the rod extends.

Figure 7:
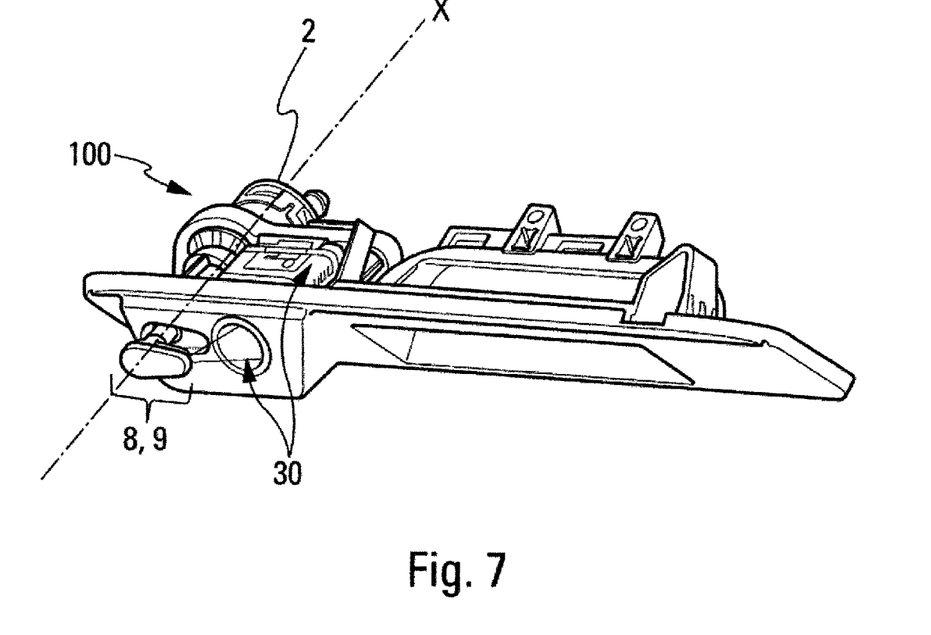
FIG. 7 is a schematic perspective view of a sensor of an optical detection system and of an associated cleaning device.

FIG. 7 illustrates the cleaning device 100 for an optical sensor 30. The fluid intake and distribution device is capable of translational movement along the axis X between a deployed position in which the distribution element 8, 9 is positioned facing the optical sensor 30, and a retracted position in which the distribution element 8, 9 is retracted into a housing in the vehicle bodywork structure in order on the one hand to protect it and on the other hand to not impede the optical detection of the sensor.

The present invention is not restricted to the embodiment described hereinabove, provided that the slots that contribute to forming the passageways between the rod and the mobile piston are arranged in the piston. By way of non-limiting example of a conceivable embodiment, provision could be made for the slots 120 formed in the mobile piston and that contribute to forming the passageways 12 to have different dimensions from one another, and notably different longitudinal dimensions, so as to control progressive arrival of cleaning fluid in the distribution element 8, 9.

The invention claimed is:

1. A cleaning device to spray at least one fluid toward a surface that is to be cleaned comprising an optical sensor of an optical detection system of a motor vehicle, the cleaning device comprising:
 a hollow body closed at one end by an inlet flange;
 a mobile piston being able to slide along a longitudinal axis in the hollow body and which at a first end bears a cleaning fluid distribution element, and the mobile piston being able to move between a retracted extreme position and a deployed extreme position via means for moving the mobile piston;
 a rod secured to the inlet flange which runs parallel to the longitudinal axis and along which the mobile piston slides; and
 means for conveying cleaning fluid through the hollow body, from a fluid intake end-piece as far as the distribution element, the means for conveying comprising at least one intake chamber, the volume of which varies according to movement of the mobile piston and a distribution duct formed in the mobile piston,
 the mobile piston and the rod being configured to provide between them at least one passageway for cleaning fluid,
 wherein the at least one passageway is formed by a slot formed on the mobile piston.

2. The cleaning device as claimed in claim 1, wherein the slot of the at least one passageway is arranged in the mobile piston parallel to the longitudinal axis.

3. The cleaning device as claimed in claim 1, wherein the mobile piston and the rod are configured in such a way that each slot formed in the mobile piston is covered, completely in the retracted extreme position, and partially in the other relative positions of the mobile piston and of the rod, by the rod.

4. The cleaning device as claimed in claim 1, wherein the slot of the at least one passageway is formed on the internal wall of the mobile piston delimiting the distribution duct.

5. The cleaning device as claimed in claim 1 wherein the slot of the at least one passageway is formed in the mobile piston so as to open onto the intake chamber.

6. The cleaning device as claimed in claim 1 wherein the means for moving the mobile piston comprise the means for conveying cleaning fluid and elastic means housed in the hollow body to tend to return the mobile piston to the extreme rest position.

7. The cleaning device as claimed in claim 1 wherein the mobile piston comprises a substantially cylindrical central part that slides inside a hollow guide sleeve formed at the opposite end of the hollow body to the inlet flange, a terminal distribution part extending the central part and to the free end of which the distribution element is able to be fixed, and an intake part extending the central part in the opposite direction to the terminal distribution part and configured to slide inside the hollow body.

8. The cleaning device as claimed in claim 7, wherein the slot of the at least one passageway is formed in the mobile piston along the intake part.

9. The cleaning device as claimed in claim 7, wherein a peripheral groove is arranged at a free end of the rod to accommodate a seal such that the rod, fitted with said seal, can slide sealingly in the central part of the mobile piston.

10. The cleaning device as claimed in claim 1 wherein a plurality of passageways is situated between the rod and the mobile piston, at least one of the slots formed in the mobile piston having an axial dimension that is distinct from that of the adjacent passageways.

11. The cleaning device as claimed in claim 1 wherein a plurality of passageways is situated between the rod and the mobile piston, at least two slots formed in the mobile piston having variable radial dimensions.

12. A motor vehicle equipped with an optical detection system and with an associated optical sensor, comprising at least one cleaning device as claimed in claim 1 to spray at least one fluid toward a surface of the optical sensor that is to be cleaned.

* * * * *